United States Patent [19]
Horiuchi

[11] Patent Number: 5,160,246
[45] Date of Patent: Nov. 3, 1992

[54] MAGNETICALLY DRIVEN CYNTRIFICAL PUMP

[75] Inventor: Korejiro Horiuchi, Kobe, Japan

[73] Assignee: Sanwa Koki Co., Ltd., Nara, Japan

[21] Appl. No.: 638,793

[22] Filed: Jan. 8, 1991

Related U.S. Application Data
[63] Continuation-in-part of Ser. No. 554,282, Jul. 17, 1990, abandoned.

[30] Foreign Application Priority Data
Nov. 8, 1989 [JP] Japan .................. 1-130348[U]

[51] Int. Cl.⁵ .............................................. F04B 35/04
[52] U.S. Cl. .................................. 417/365; 384/223; 415/229; 417/420; 417/423.13
[58] Field of Search ............. 417/420, 423.12, 423.13, 417/365; 384/223, 225, 420; 415/229

[56] References Cited

U.S. PATENT DOCUMENTS

| | | | |
|---|---|---|---|
| 4,013,384 | 3/1977 | Oikawa | 417/370 X |
| 4,212,601 | 7/1980 | Ina | 417/365 |
| 4,363,608 | 12/1982 | Mulders | 417/423.12 |
| 4,573,882 | 3/1986 | Watanabe et al. | 417/423.12 X |
| 4,672,249 | 6/1987 | Iwata et al. | 384/223 X |
| 4,722,661 | 2/1988 | Mizuno | 417/420 X |
| 4,812,108 | 3/1989 | Kotera | 417/420 X |
| 4,871,301 | 10/1989 | Buse | 417/420 |
| 4,874,300 | 10/1989 | Laing et al. | 417/420 |

OTHER PUBLICATIONS

Ramey, IBM Technical Disclosure Bulletin, vol. 20, No. 12, May 1978.

Primary Examiner—Leonard E. Smith
Attorney, Agent, or Firm—Koda and Androlia

[57] ABSTRACT

In a magnetically driven pump so designed that a drive power of an electric motor is transmitted from a magnets-embedded drive rotor to a magnets-embedded follower rotor opposed to one another by way of a magnetic coupling, the follower rotor and an impeller are secured respectively to the opposite ends of a rotating shaft to which a thrust bearing of ceramic material is fastened for receiving an axial load, wherein a cushioning member is mounted on the rotating shaft so as to push the thrust bearing from the rear, in the position between the thrust bearing and a flange provided on the rotating shaft for determining the position of the follower rotor.

4 Claims, 2 Drawing Sheets

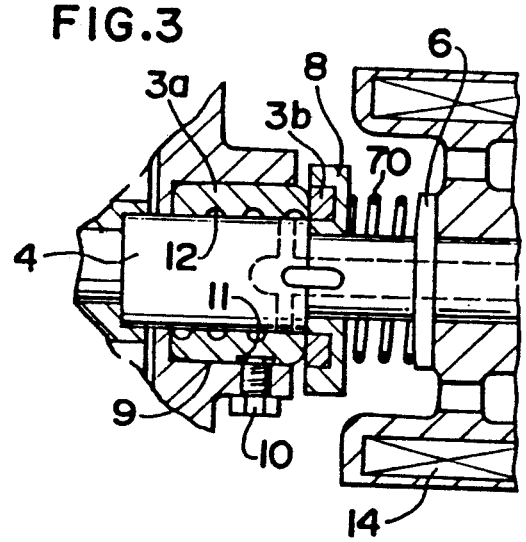
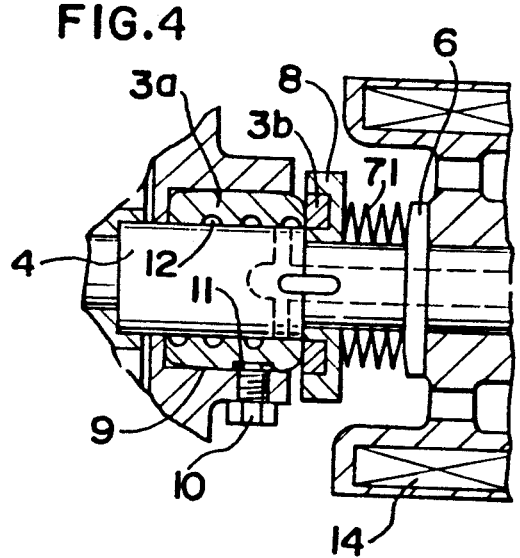
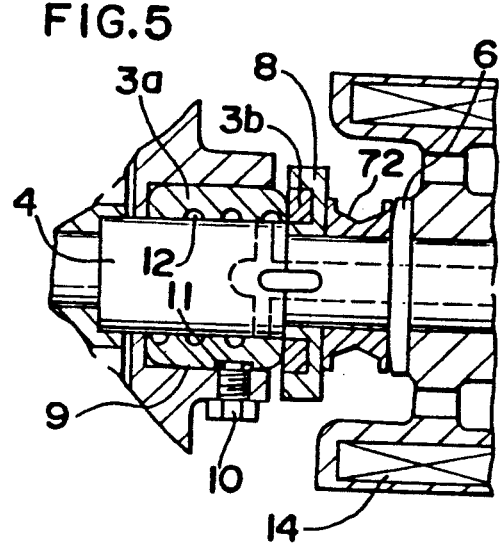

MAGNETICALLY DRIVEN CYNTRIFICAL PUMP

CROSS REFERENCE TO RELATED APPLICATIONS

This is a continuation-in-part of U.S. patent application Ser. No. 554,282 filed Jul. 17, 1990 now abandoned.

BACKGROUND AND SUMMARY OF THE INVENTION

The present invention relates to a magnetically driven pump, particularly in the form of a centrifugal pump of a single suction structure, in which a drive power of an electric motor is transmitted from a drive rotor to a follower rotor by way of a magnetic coupling, thus causing a rotating shaft with an impeller of the pump to turn integrally with the follower rotor.

In a centrifugal pump of a single suction structure of the above-mentioned type, an impeller is fixed to one end portion of the rotating shaft, which is rotatably supported in the center line of a pump casing by way of a supporting member attached internally to the casing. Furthermore, a bearing of ceramic material resistant to hard wear is interposed between the rotating shaft and the supporting member so as to withstand a high speed of rotation of the rotating shaft.

In the operation of the above-described centrifugal pump, a magnets-embedded drive rotor is rotated directly by an electric motor, and a magnets-embedded follower rotor opposed inside to the drive rotor is rotated accordingly by indirect way of a magnetic coupling, so that the rotating shaft with the impeller is caused to rotate integrally with the follower rotor. Due to the rotation of the rotating shaft, the impeller imparts centrifugal force to the liquid coming into a suction port which is configured in the axial center of the impeller, thus carrying the liquid radially in an accelerated manner.

However, the impeller sending out the liquid, at high speedy rotation, adversely receives an uneven reaction of axial load (thrust) and radial load, so that the rotating shaft is subjected to unbalanced vibration. For this reason, the ceramic bearing, which can withstand hard wear but is relatively low in toughness against breakage, suffers damage or breakage due to the influence of axial load and impact occurring with the vibration of the rotating shaft at high speedy rotation.

It is accordingly a primary object of the present invention to provide a magnetically driven pump, of which the ceramic bearing has no fear of damage and breakage, so designed as to relieve the influence of thrust load and vibration of the impeller rotating shaft at high speedy rotation on the ceramic bearing by absorbing such thrust load and vibration.

It is a secondary object of the present invention to provide a magnetically driven pump so designed as to prevent the likely vibration of the rotating shaft at high speedy rotation by the operation of a so-called self-aligning.

It is a further object of the present invention to provide a magnetically driven pump so designed as to save the likely wear and fatigue on the ceramic bearing due to contact with the rotating shaft by cooling the frictional heat which generates between the bearing and the rotating shaft.

With the above and other objects in view, the present invention provide a magnetically driven pump so designed that a drive power of an electric motor is transmitted from a magnets-embedded drive rotor to a magnets-embedded follower rotor opposed to one another by way of a magnetic coupling; comprising a pump casing separated internally by a partition into two rooms of which one accommodates the drive rotor and the other accommodates the follower rotor, a rotating shaft having a flange for determining the position of the follower rotor, and holding the follower rotor on one end portion thereof while holding an impeller on the other end, the rotating shaft being supported with an interposing bearing of ceramic material which is fitted into a supporting member fixed in the pump casing, a thrust bearing of ceramic bearing being juxtaposed in contact with said interposing bearing so as to receive an axial load of the rotating shaft, and a cushioning member being mounted on the rotating shaft in the position between the thrust bearing and said flange so as to push the thrust bearing from the rear.

Preferably, the interposing bearing has an exterior surface curved outwards like the bilge of a barrel, while an interior surface of the interposing bearing is provided with a spiral groove.

BRIEF DESCRIPTION OF THE DRAWING

The present invention will now be described by way of example with reference to the accompanying drawings in which:

FIGS. 3 to 5 are views, similar to FIG. 2, of other modifications.

DETAILED DESCRIPTION OF THE PREFERRED EMBODIMENTS

Figure 1:
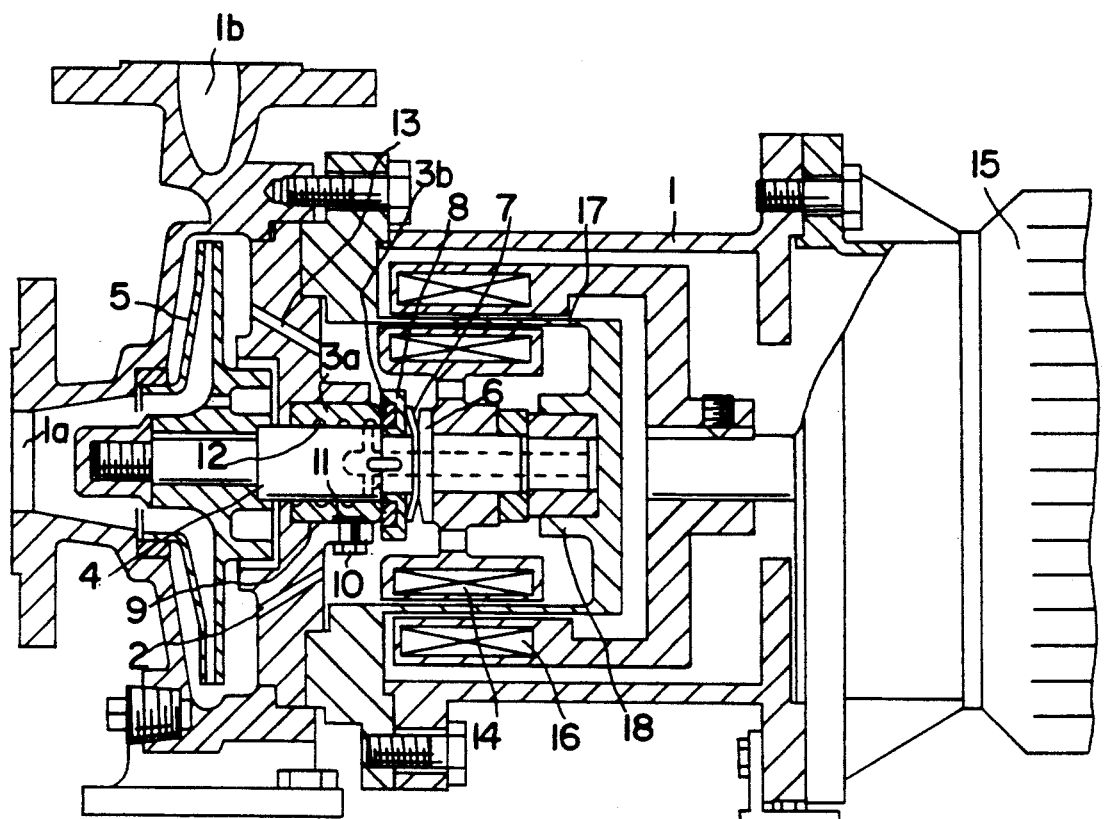
FIG. 1 is a longitudinal sectional view of a magnetically driven pump embodying the present invention.

Referring to FIG. 1, the reference numeral 1 designates a casing of a magnetically driven pump, which is divided internally into two major rooms by a recessed fluidtight partition 17, shaped nearly like a beaker, of nonmagnetic material. In the room located on the side of an electric driving motor 15, a drive rotor 16 with pieces of magnet embedded therein is connected to a driving shaft of the motor 15, while being arranged in such a manner as to surround the partition 17. In the other room located on the side of a fluid intake 1a, a rotating shaft 4 is rotatably supported in the center on the same axis as the driving shaft of the motor, wherein the inmost end portion of the rotating shaft 4 is maintained in a boss 18 formed on the internal bottom of the partition 17 while the middle portion of the rotating shaft 4 is maintained by a supporting member 2 which is attached fast to the casing 1 and subdivides the latter room. On the intermediate portion situated between the inmost end portion and the middle portion of the rotating shaft 4, there is mounted a follower roller 14 with pieces of magnet embedded therein in opposition to the aforesaid drive roller 16, wherein the cylindrical part of the partition 17 is located between both the rotors 14, 16. The follower rotor 14 is caused to rotate with the rotation of the drive rotor, due to a magnetic coupling. An impeller 5 is mounted on the outermost end portion of the rotating shaft 4 so that the fluid entering an intake 1a of the pump can be forcibly carried with a high kinetic energy to an outlet 1b of the pump by the rotation of the impeller 5.

Figure 2:
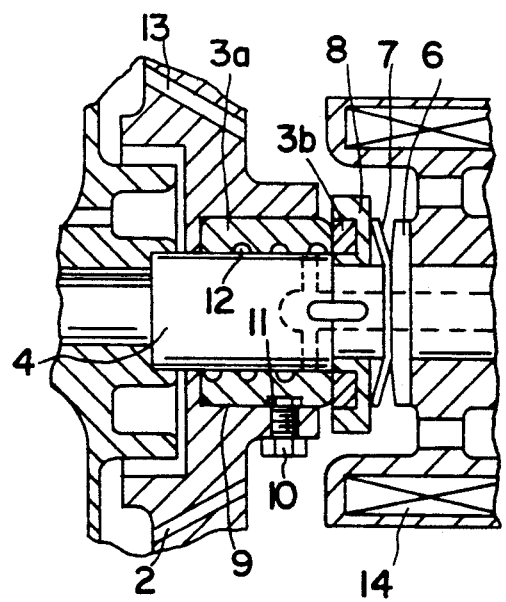
FIG. 2 is an enlarged view of FIG. 1, showing the characteristic parts of the same pump.

In the magnetically-driven centrifugal pump so constructed as described above, an interposing bearing 3a of ceramic material which can take radial and axial loads is fitted onto a center penetration hole of the supporting member 2 in such a manner as to surround the rotating shaft 4, to avoid damage caused by friction. The interposing ceramic bearing 3a has an exterior surface 9 curved outwards like the bilge of a barrel, as shown particularly in FIG. 2, thus being moderately swingable in relation to the supporting member 2. That is, the ceramic bearing 3a functions as self-aligning-mechanism to absorb the axial shake of the rotating shaft. A screw bolt 10 is one that restricts the rotational and axial movement of the interposing ceramic bearing 3a by putting the free end of the bolt 10 loosely into a depression 11 formed on the exterior surface 19 of the interposing bearing 3a.

A thrust bearing 3b of ceramic material in the form of a collar which can take an axial load, is fastened directly or indirectly to the rotating shaft 4 in such a manner as to be in contact with the rear end face of the above-described interposing bearing 3a. As a result, the thrust bearing 3b can be rotated integrally with the rotating shaft 4. The thrust bearing 3b may be fastened onto the rotating shaft 4 by inserting a key therebetween. Otherwise, the thrust bearing 3b may be fastened to the rotating shaft 4, as shown in the drawing, by way of a retainer 8 of metal which is attached firmly to the rotating shaft 4, for example, with a key.

A cushioning member 7 is mounted on the rotating shaft 4 in the position between the above-described thrust bearing 3b and a flange 6 which is provided integrally with the rotating shaft 4 to determine the position of the aforesaid follower rotor 14, so as to push the thrust bearing 3b from the rear. Accordingly, the thrust bearing 3b tends to maintain contact with the other interposing bearing 3a on the not-rotational side. For this reason, in case where undesirable vibration happens to the rotating shaft 4 at a high speed, there is no fear that both the bearings 3a, 3b taking an axial load will mutually exert impact occurred by beating one another, since the cushioning member 7 constrains both the bearings 3a, 3b so as to come in contact with one another without loosing such contact. Thus, the rotating shaft 4 and impeller 5 is surely caused to operate at a steady state.

The above-mentioned cushioning member 7 is any one in the forms of a cushioning spring, a cushioning rubber, a cushioning extrusion of elastic plastics, and the like. For the cushioning spring, it is possible to specify a dish-shaped plate spring 7 of metal or hard plastics as shown FIG. 1, a coiled spring 70 as shown in FIG. 3, and a bellows spring 71 as shown FIG. 4. For the cushioning rubber and the cushioning extrusion of elastic plastics, it is possible to specify a component 72 shaped like a hollow cylinder recessed, as shown in FIG. 5, swelled or even in the middle surface, and a component shaped like a O-ring. All of the cushioning spring, the cushioning rubber, and the cushioning extrusion of elastic plastics are adapted to receive the rotating shaft 4. In the case where a liquid used in the pump is of corrosiveness, the cushioning spring, the cushioning rubber, and the cushioning extrusion of elastic plastics may be preferably made up of corrosion resistant material.

Besides, the ceramic bearing 3a on the not-rotational side has an interior surface provided with a spiral groove 12. While the liquid flowing through the intake 1a into the pump is discharged from the outlet 1b by the rotation of the impeller 5, a part of the liquid is caused to make one's way between both the bearing 3a on the non-rotational side and the other bearing 3b on the rotational side through side holes 13 made in the supporting member 2. The penetrated liquid is guided by the spiral groove of the bearing 3a, and is then caused to flow back into the inside room of the impeller 5 by the attraction of the rotating impeller 5. Accordingly, frictional heat, which tends to generate between the bearing 3a on the not-rotational side and the bearing 3b and rotating shaft 4 on the rotational side, is caused to cool, so that it is possible to prevent the likely wear and fatigue on the both the bearings 3a, 3b and the rotating shaft 4.

We claim:

1. A magnetically driven pump so designed that a drive power of an electric motor is transmitted from a magnets-embedded drive rotor to a magnets-embedded follower rotor opposed to one another by way of a magnetic coupling; comprising a pump casing separated internally by a partition into two rooms of which one accommodates the drive rotor and the other accommodates the follower rotor, a rotating shaft holding the follower rotor on the inward end portion thereof while holding an impeller on the outward end, the rotating shaft being supported with an interposing bearing of ceramic material of non-rotation which is fitted into an secured to a supporting member fixed in the pump casing, a thrust bearing of ceramic bearing being secured to the rotating shaft for integral rotation and juxtaposed in contact with said interposing bearing of non rotation so as to receive an axial load of the rotating shaft, a flange, for determining outward the position of the follower rotor, which is provided integrally on the rotating shaft at a predetermined position separated inwards from the thrust bearing, and a cushioning member being mounted on the rotating shaft in the position between the thrust bearing and said flange so as to positively push the thrust bearing continuously outwards from the rear against the interposing bearing of non-rotation, directly, whereby the rotational side thrust bearing can continue in contact with the interposing bearing of non-rotation without loosening.

2. A magnetically driven pump as defined in claim 1, wherein the cushioning member is any one in the forms of a cushioning spring, a cushioning rubber and a cushioning extrusion of elastic plastics, which are adapted to receive the rotating shaft 4.

3. A magnetically driven pump as defined in claim 1, wherein the interposing bearing has an exterior surface curved outwards like the bilge of a barrel in a manner swingable in relation to the supporting member.

4. A magnetically driven pump as defined in claim 1, wherein the interposing bearing has an interior surface provided with a spiral groove.

* * * * *